Feb. 20, 1934.  A. L. V. C. DEBRIE  1,948,066
CINEMATOGRAPHIC PRINTING MACHINE
Filed March 3, 1932

Patented Feb. 20, 1934

1,948,066

UNITED STATES PATENT OFFICE 1,948,066

CINEMATOGRAPHIC PRINTING MACHINE

André Léon Victor Clement Debrie, Paris, France

Application March 3, 1932, Serial No. 596,645, and in France January 26, 1933

4 Claims. (Cl. 88—24)

My invention has for its object improvements in cinematographic printing machines comprising a source of light and an exposure gate in front of which the negative film and the positive film to be impressed move simultaneously, the two gelatine coated surfaces of these films facing one another and being in contact one with the other. Printing machines of this type are already known wherein the printing of titles, texts and the like letter-press is effected directly on the positive film without their being previously printed on the negative, said titles letter-press or the like appearing on a strip or band interposed between the source of light and the exposure gate, with each title, text or the like occupying only the height of one picture and separated from the next title, text or the like by a transparent space occupying the height of one picture. This band moves parallel to the two films through the height of one picture at each change and the printing of the title, texts etc., is effected through an objective disposed between the band and the gate while the printing of the actual pictures without their title, letter-press or the like is effected through a transparent part of the band. If the title is to occupy the entire height of the picture, the negative film may show while the title is being printed, a transparent portion corresponding to the length required by the title. If on the contrary, the title is to occupy only part of the picture it would be drawn in black on the band and be printed on the positive in place of non-illuminated portions of the negative picture.

But, heretofore, machines of the above type have not proved satisfactory for the following reason: the band carrying the titles, letter-press and the like shows of necessity, spots, or defective or dusty parts which are reproduced on the positive and, owing to the very principle of the machine each of these defects persists throughout a certain length of the film. If this is admissible during the passage of a title which lasts only a few seconds, it is on the contrary intolerable during the passage of a whole scene which may correspond in the printing process, to a very long immobility of the band in front of the positive and negative films.

My invention has for its object an improvement in the general arrangement of a printing machine of the above type whereby this serious drawback may be put aside. It consists in the willful unfocusing through any suitable means of the system comprising the band, the films and the objective during the whole time the band does not serve for the printing of titles, letter-press or the like i. e. while this band shows a transparent part in front of the exposure gate.

This result may be obtained in a large number of different manners. I have shown by way of example one of the possible forms of execution of my invention in accompanying drawing wherein.

Figure 1:
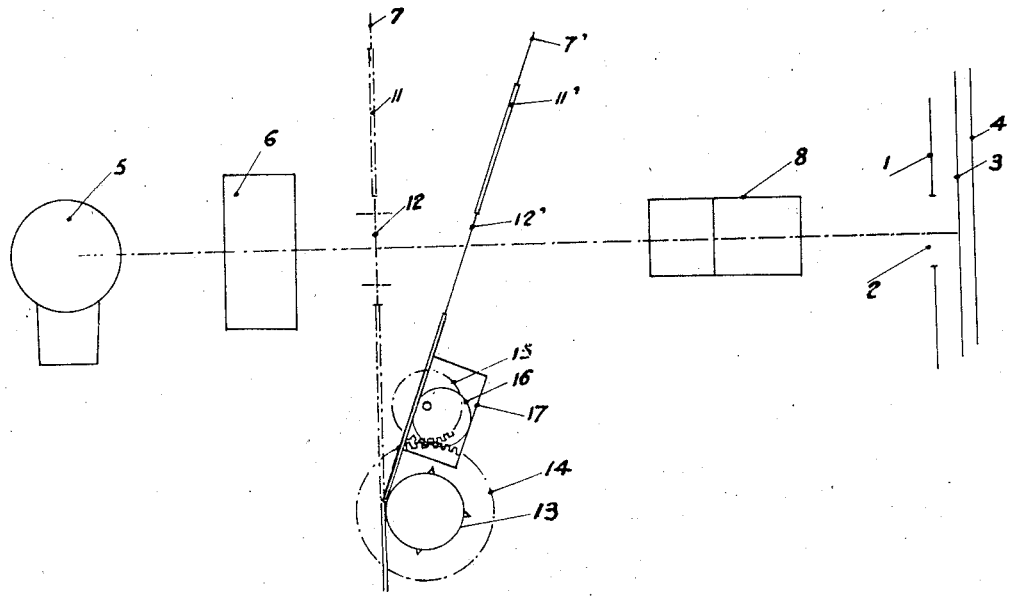
Fig. 1 is a diagrammatical side view of the whole arrangement.

The printing machine comprises a casing 1 with its exposure gate 2 in front of which the negative film 3 and the positive film 4, pass together with their sensitized faces in contact.

In front of the gate 2 is disposed a source of light 5 which sends its light rays through the collimator 6, the band 7 and the object glass 8 on to the negative and positive films 3 and 4.

Figure 2:
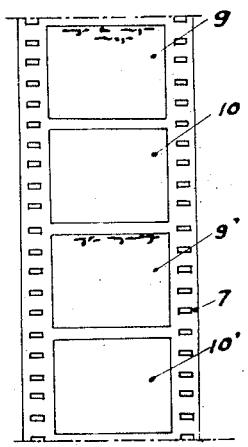
Fig. 2 is a front view of the band carrying the titles, texts etc.

The band 7 is constituted as shown in Fig. 2; it comprises parts 9, 9' the height of which is that of a picture and which carry inscriptions, titles, texts etc., said parts 9, 9' being separated by transparent parts 10, 10' the height of which is also equal to that of a picture. This band 7 passes through a channel 11 provided with a gate 12 in the path of the rays sent out by the lamp 5 and it is driven by an intermittently advancing drum 13 having as a cross-section a Maltese cross and disposed underneath the gate 12.

According to my invention, a pinion 14 keyed to the axis of the drum 13 meshes with a pinion 15 the gear ratio of which with reference to the pinion 14 is such that for each rotation of the drum 13 (through one quarter of a revolution in the case of four pictures) the pinion 15 rotates through a half revolution. On the shaft of the pinion 15 is mounted an eccenter 16 carried by a strap 17 secured to the channel 11 through which the band 7 moves.

The working is easy to understand:

Each time the drum 13 rotates through one quarter of a revolution, i. e. the band 7 advances through the height of one picture, the pinion 15 rotates through a half-revolution and the eccenter 16 brings through the agency of the strap 17 the channel 11 and the band 7 alternatively into the position shown in interrupted lines in Fig. 1 and into the position 11', 7' shown in full lines.

The first position corresponds to the period for which the parts 9, 9' etc., are in front of the gate 12 and the titles or the like carried by them are correctly focused while the second position corresponds to the passage in front of the gate 12 of the transparent parts 10, 10' of the gate 7. The focusing is then completely destroyed and the imperfections, spots and the like appearing on the band 7 disappear from the positive film 4.

It should be well understood that this form of execution of the invention is given solely by way of example and that the result sought for i. e. the alternative suppression and restoration of the focusing could be obtained through any other device adapted to provide the relative displacement between the parts 11—8 on one hand and 3—4 on the other. Thus the gate 7 instead of being rocked may be moved into a plane parallel to its own plane. I might also act on the objective 8 or again on the assembly of the two films 3—4 because the printing of the scenes being effected through contact and not through projection, the objective 8 has no part to play in the printing.

What I claim is:

1. In a cinematographic printing machine, the combination of a positive film, a negative scene-carrying film in contact with the positive film, means for driving simultaneously both films, an auxiliary band provided with a plurality of alternating blank and inscription carrying spaces the height of all of which is equal to that of a picture of the negative, means for advancing said band through heights equal to that of one space, a source of light on the outside of the band with reference to the films adapted to illuminate said band and films, an object-glass adapted to focus the band on the positive film through the negative film and mechanical means for shifting the band out of focus with reference to the object-glass and film arrangement whenever a blank space of the band is being projected on the positive film.

2. In a cinematographic contact printing machine the combination of a printing gate for the positive film, a channel, a band provided with a plurality of alternating blank and inscription carrying spaces, a gate in the channel in front of the printing gate, a source of light illuminating the channel gate, an objective adapted to focus the band on the film gate and means for moving the band out of focus with reference to the film gate whenever the blank parts of the band appear in the channel gate.

3. In a cinematographic contact printing machine the combination of a printing gate for the positive film, a channel, a band provided with a plurality of alternating blank and inscription carrying spaces, a gate in the channel in front of the printing gate, a source of light illuminating the channel gate, an objective adapted to focus the band on the film gate and means for rocking the channel and band with reference to its normal position whenever the blank parts of the band appear in the channel gate.

4. In a cinematographic contact printing machine the combination of a printing gate for the positive film, a channel, a band provided with a plurality of alternating blank and inscription carrying spaces, a gate in the channel in front of the printing gate, a source of light illuminating the channel gate, an objective adapted to focus the band on the film gate, a Maltese cross adapted to move the band through a distance corresponding to the successive spaces on it, a pinion controlled by said Maltese cross and adapted to rotate through one half revolution for each partial rotation of said Maltese cross, a strap secured to the channel, a pivot round which the channel is adapted to rock with the band carried by it and means whereby the pinion for one of its alternative positions acts on the strap for rocking the channel into a position for which the band is unfocused and for the other position returns it into its normal position for which the band is focused.

ANDRÉ LÉON VICTOR CLEMENT DEBRIE.

CERTIFICATE OF CORRECTION.

Patent No. 1,948,066.   February 20, 1934.

ANDRE LEON VICTOR CLEMENT DEBRIE.

It is hereby certified that error appears in the printed specification of the above numbered patent requiring correction as follows: Page 1, line 6, in the heading to the printed specification for "January 26, 1933" read January 26, 1932; and that the said Letters Patent should be read with this correction therein that the same may conform to the record of the case in the Patent Office.

Signed and sealed this 15th day of May, A. D. 1934.

Bryan M. Battey (Seal)

Acting Commissioner of Patents.